US006876396B2

(12) United States Patent
Mizobuchi et al.

(10) Patent No.: US 6,876,396 B2
(45) Date of Patent: Apr. 5, 2005

(54) VIDEO SIGNAL PROCESSING DEVICE FOR DISPLAYING INFORMATION IMAGE ON DISPLAY PART

(75) Inventors: Ayumi Mizobuchi, Tokyo (JP); Kasumi Takeda, Tokyo (JP); Mami Uchida, Saitama (JP)

(73) Assignee: Sony Corporation, Tokyo (JP)

( * ) Notice: Subject to any disclaimer, the term of this patent is extended or adjusted under 35 U.S.C. 154(b) by 559 days.

(21) Appl. No.: 10/088,786

(22) PCT Filed: Jul. 25, 2001

(86) PCT No.: PCT/JP01/06410

§ 371 (c)(1),
(2), (4) Date: Mar. 21, 2002

(87) PCT Pub. No.: WO02/09421

PCT Pub. Date: Jan. 31, 2002

(65) Prior Publication Data

US 2002/0149699 A1 Oct. 17, 2002

(51) Int. Cl.[7] ............................ H04N 5/445; H04N 5/45
(52) U.S. Cl. .................... 348/564; 348/565; 348/569
(58) Field of Search .............................. 348/563, 564, 348/565, 567, 568, 569, 586, 588, 589, 598, 600; 725/112, 113, 40, 41, 43, 42; H04N 5/445, 5/45

(56) References Cited

U.S. PATENT DOCUMENTS

| | | | | |
|---|---|---|---|---|
| 5,959,687 A | * | 9/1999 | Dinwiddie et al. | 348/564 |
| 6,061,719 A | * | 5/2000 | Bendinelli et al. | 725/112 |
| 6,075,568 A | * | 6/2000 | Matsuura | 348/563 |
| 6,215,483 B1 | * | 4/2001 | Zigmond | 725/112 |

FOREIGN PATENT DOCUMENTS

| | | | |
|---|---|---|---|
| JP | 6-89362 A | * | 3/1994 |
| JP | 10-177532 A | * | 6/1998 |
| JP | 10-257401 A | * | 9/1998 |

* cited by examiner

Primary Examiner—Sherrie Hsia
(74) Attorney, Agent, or Firm—Jay H. Maioli

(57) ABSTRACT

A video signal processor wherein information included in video information displayed by a supplied video signal is utilized without requiring excessive effort by a user. When an execution instruction input of a screen memo function is received from the user through a remote controller (100), a control part (20) controls a capture memory part (5) to fetch a displayed image as a static image. The fetched static image is supplied to a child screen processing part (9) and displayed on a child screen. The control part (20) recognizes characters of character information included in the image fetched to the capture memory part and stores them in an EEPROM (24) to be secondarily used.

13 Claims, 8 Drawing Sheets

VIDEO SIGNAL PROCESSING DEVICE FOR DISPLAYING INFORMATION IMAGE ON DISPLAY PART

TECHNICAL FIELD

The present invention relates to a video signal reproducing device such as an optical disc reproducing device which uses a receiver for receiving a television signal or a VTR (video tape recorder) or a DVD (Digital Versatile Disc) serving as an optical disc as a recording medium, or a video signal processor and an image reproducing device such as a television picture receiver.

BACKGROUND ART

A television broadcasting program, what is called a television shopping that articles of trade are introduced by the television broadcasting program (refer it to as a television broadcast program, hereinafter) and the purchase application for the articles of trade is accepted by a telephone is broadcast. In this television shopping, the telephone number of the other party to which a purchase application is made is most frequently displayed on the display screen of the television picture receiver (refer it to as a television receiver, hereinafter) as display information in the broadcast program to provide the telephone number for viewers.

Further, as the number of users of the internet increases, television broadcast programs have been increased that opinions, impressions, requests, etc. for the television broadcast programs are accepted or applications for presents to viewers are accepted by electronic mails (E-Mail) for transmitting and/or receiving information through the internet.

Further, there have been also increased television broadcast programs that, what is called a Web page as provided information which can be accessed through the internet is opened in a server device connected to the internet, and the detailed information or the like of information introduced while the television broadcast program is broadcast is provided through the Web page.

In these television broadcast programs, when the electronic mail or the Web page is employed, a mail address serving as the destination of the electronic mail or a URL (Uniform Resource Locator) which specifies the Web page to access the Web page is frequently displayed on the display screen of the television picture receiver as display information in the television broadcast program to be provided for the viewers.

When the information which specifies the destination of the other party of a communication such as a telephone number, a mail address, a URL, etc. is displayed in a television broadcast program which a viewer watches, the viewer takes copies of them on a memo sheet. Then, the viewer telephones, or writes an electronic mail and transmits it to the other party specified by the copied mail address, or accesses a Web page specified by the copied URL to read it.

As described above, in the television broadcast program that various kinds of applications are accepted or information is provided through a communication network such as a telephone or the internet, the display of telephone numbers, electronic mail addresses, URLs. etc. may be sometimes finished while the viewer prepares a memo sheet or takes copies of them.

Therefore, is recently loaded in some of television picture receivers, what is called a screen memo function that a displayed image is fetched as a static image and the static image is displayed so that necessary information can be relatively slowly recognized without the limitation of time, or the memo of the necessary information can be precisely taken.

As described above, when the viewer tries to communicate with the other party or receive the provision of information by using the telephone number, the electronic mail address or the URL provided in the television broadcast program, the viewer needs to copy them on a memo sheet, or to dial the telephone number and manually input the electronic mail address or the URL while viewing the information fetched as the static image in accordance with the screen memo function.

Therefore, there are frequently generated mistakes that the wrong telephone number is dialed, the electronic mail cannot be transmitted to the destination of the other party, or a desired Web page cannot be accessed or the like due to an input error. Further, when the viewer copies the wrong telephone number, the wrong electronic mail address, and the wrong URL on a memo sheet by mistake, the viewer cannot communicate with the desired party even by telephoning many times or repeatedly inputting the electronic mail address or the URL.

Recently, there is provided a what is called an internet television picture receiver capable of being connected to the internet which is provided with a communication function as well as a function as the television picture receiver. The use of this internet television picture receiver makes it possible to connect the television picture receiver to the internet, to transmit and/or receive an electronic mail and access a Web page with the same sense as to view the television broadcast program without using a personal computer or the like.

A function as the television picture receiver for receiving and reproducing the television broadcasting signal of the internet television picture receiver is different from an internet connecting function for connecting the internet television picture receiver to the internet. Therefore, in the internet television picture receiver, when the viewer uses the electronic mail address or the URL provided by the television broadcast program, the viewer also needs to input them one by one.

When using the screen memo function, since the screen on which the electronic mail address or the URL is displayed is fetched as the static image and the static image is displayed, information provided thereafter during the television broadcast program may be possibly overlooked.

DISCLOSURE OF THE INVENTION

It is an object of the present invention to solve the above-described problems by taking the above-described circumstances into consideration and to provide a video signal processor in which information included in video information displayed by a supplied video signal can be employed without annoying a user and the video information displayed by the supplied video signal is not overlooked.

The video signal processor according to the present invention proposed to solve the above-described problems comprises: fetch instruction input accepting means which accept an image fetch instruction input in accordance with a received or read video signal; image storing means which fetch the video signal of one screen and store it when the fetch instruction input is accepted by the fetch instruction input accepting means; video signal processing means which provide a subscreen in a display area as a part of a display screen when the fetch instruction input is accepted by the fetch instruction input accepting means so that the image by the video signal of one screen stored in the image storing means is displayed on the subscreen and the image in accordance with the received or read video signal is displayed on the main screen of the display area except the subscreen; character information recognizing means which recognize characters in character information displayed in the image displayed by the video signal of one screen stored in the image storing means; character information extracting means which extract necessary information from the character information the characters of which are recognized by the character recognizing means; and character information storing means which store the character information extracted by the character information extracting means.

According to the video signal processor, when the fetch instruction input is received from the user through the fetch instruction input means, a video signal for forming an image of one screen among the received or read video signals is fetched and stored by the image storing means. The image of one screen by the video signal fetched by the image storing means is displayed on the subscreen and the image by the subsequently received or subsequently read video signal is displayed on the main screen by the video signal processing means.

The character information included in the image by the video signal which is fetched by the image storing means so as to be displayed on the subscreen is recognized by the character information recognizing means and the necessary information of the recognized character information is extracted by the character information extracting means and stored in the character information storing means.

Thus, when the image including the necessary character information is displayed, the video signal thereof is fetched by the image storing means so that the image by the fetched video signal can be displayed and recognized on the subscreen provided on the display area as a part of the display screen and the image by the subsequently received or subsequently read video signal can be displayed and viewed on the main screen. Therefore, the necessary information can be assuredly recognized and the image by the subsequently received or subsequently read video signal can be watched without overlooking it.

Further, the characters of the necessary information of the character information displayed in the image displayed on the subscreen are recognized by the character recognizing means and extracted by the character extracting means and the extracted characters are stored in the character information storing means. Thus, the character information can be read as required and secondarily used. Accordingly, the information included in the displayed image can be obtained and used without annoying the hand of the user.

Further, the video signal processor according to the present invention comprises: communicating means to be connected to a communication network so that a communication process is performed; fetch instruction input accepting means which accept an image fetch instruction input in accordance with a received or read video signal; image storing means which fetch the video signal of one screen and store it when the fetch instruction input is accepted by the fetch instruction input accepting means; video signal processing means which provide a subscreen in a display area as a part of a display screen when the fetch instruction input is accepted by the fetch instruction input accepting means so that the image by the video signal of one screen stored in the image storing means is displayed on the subscreen and the image in accordance with the received or read video signal is displayed on the main screen of the display area except the subscreen; using instruction input accepting means which accept the using instruction input of character information included in the image displayed on the subscreen; character information recognizing means which recognize characters in the character information displayed in the image displayed by the video signal of one screen stored in the image storing means, when the using instruction input is accepted through the using instruction input accepting means; character information extracting means which extract character information indicating the other party of a communication from the character information the characters of which are recognized by the character recognizing means; and control means which control to perform a communication process through the communicating means on the basis of the character information extracted by the character extracting means.

According to the video signal processor, when the fetch instruction input is received from the user through the fetch instruction input means, a video signal for forming an image of one screen of the received or read video signals is fetched and stored by the image storing means. The image of one screen by the video signal fetched by the image storing means is displayed on the subscreen and the image by the subsequently received or subsequently read video signal is displayed on the main screen by the video signal processing means.

When an instruction for using the character information displayed in the image displayed on the subscreen is received through the using instruction input means, the character information displayed in the image displayed on the subscreen is recognized by the character information recognizing means and the character information indicating the other party of the communication among the recognized character information is extracted by the character information extracting means. Respective parts are controlled by the communication control means so as to perform a communication through the communicating means on the basis of the extracted character information.

Thus, when the image including the character information indicating the other party of the communication is displayed, the image can be automatically recognized and a communication can be performed by using it. Therefore, the character information showing the other party of the communication displayed in the image by the received or read video signal can be obtained without annoying the hand of the user and the communication can be performed by employing it.

Further, the image by the video signal fetched by the image storing means can be displayed and recognized on the subscreen provided in the display area as a part of the display screen and the image by the continuously received or read video signal can be displayed and viewed on the main screen. Accordingly, the character information showing the other party of the communication can be assuredly recognized and the image provided by the continuously received or continuously read video signal can be also viewed without overlooking it.

Other objects of the present invention and specific advantages obtained by the present invention will become more apparent from the description of an embodiment which follows.

BEST MODE FOR CARRYING OUT THE INVENTION

Figure 1:
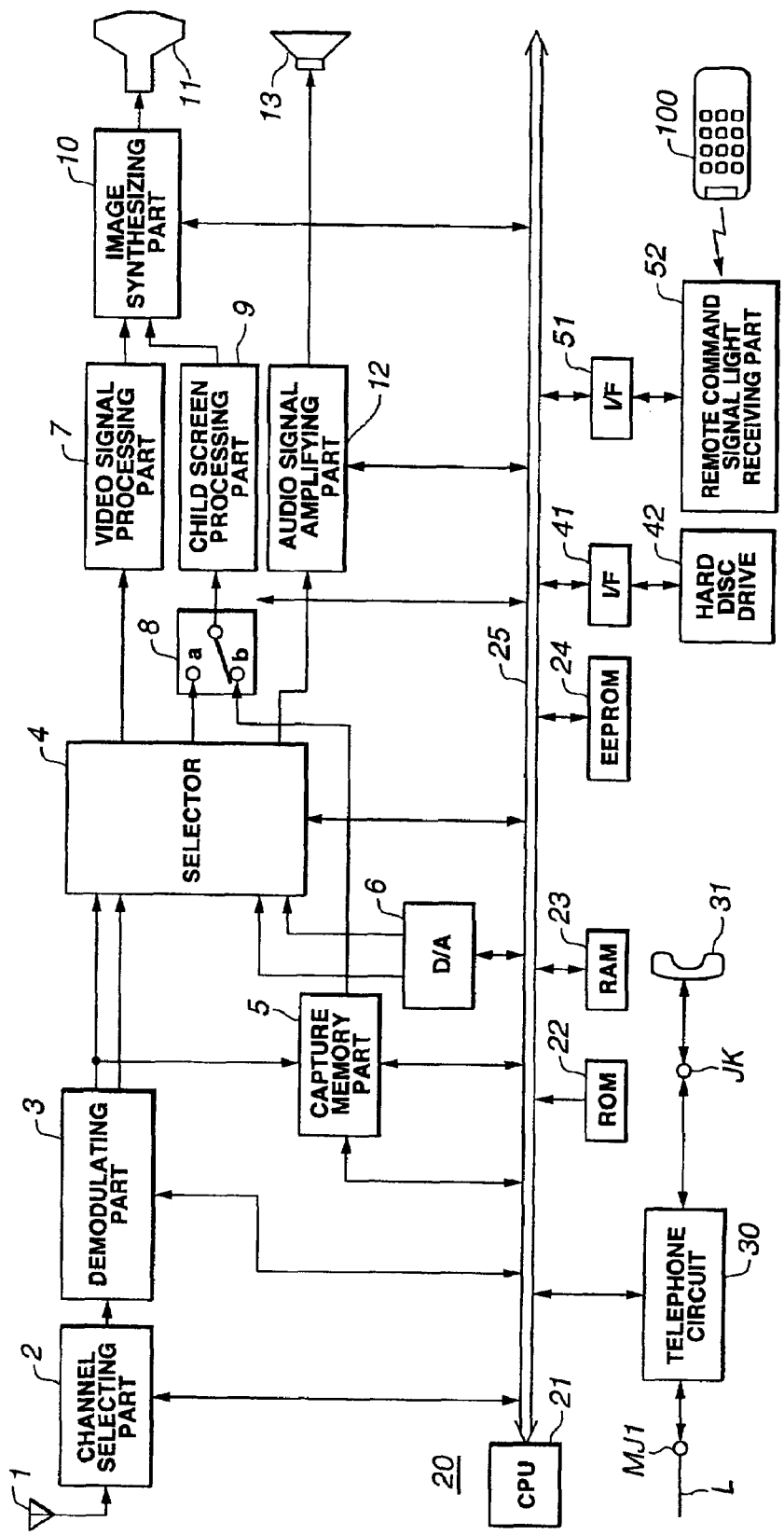
FIG. 1 is a block diagram showing a receiver and television picture receiver constituting a video signal processor according to the present invention.

Now, an embodiment of a video signal processor and an image display device according to the present invention will be described by referring to the drawings.

In the embodiment described below, the video signal processor and the image display device according to the present invention is applied to a television picture receiver.

The television picture receiver to which the present invention is applied has such a construction as illustrated by a block diagram in FIG. 1.

The television picture receiver according to the present invention comprises a channel selecting part (tuner part) 2 connected to the receiving antenna 1 of a television broadcast signal of ground wave installed outside, a demodulating part 3, a selector 4, a capture memory part 5, a D/A converting part 6, a video signal processing part 7, a switch circuit 8, a child screen processing part 9, an image synthesizing part 10, a cathode-ray tube as a display 11, an audio signal amplifying part 12 and a speaker 13.

Further, the respective parts of the television picture receiver shown in FIG. 1 are controlled by a control part 20. The control part 20 is a microcomputer comprising a CPU (Central Processing Unit) 21, a ROM (Read Only Memory) 22, a RAM (Random Access Memory) 23 and an EEPROM (Electrically Erasably Programmable Read Only Memory) 24 which are connected together through a CPU bus 25.

The ROM 22 records various kinds of processing programs executed in the television picture receiver according to the present invention or data required for processes or the like. The RAM 23 is mainly used as a working area for various kinds of processes, for instance, temporarily storing and holding data obtained in the various kinds of processes. The EEPROM 24 is, what is called, a nonvolatile memory in which stored and held information is not lost even when a power is turned off and various parameter information is stored and held.

To the control part 20, a telephone circuit 30 is connected. The telephone circuit 30 serves to connect a communication network such as a telephone network or the internet to the television picture receiver of this embodiment. In this embodiment, the telephone circuit 30 is connected to a telephone line L connected to the telephone network. A terminal MJ connected to the telephone line L is, what is called, a modular jack for connecting the telephone line L to the television picture receiver of this embodiment. To the telephone circuit 30, a handset 31 for speaking is connected through a connecting terminal JK.

The television picture receiver of this embodiment is connected to the internet through the telephone circuit 30, the telephone line L and a prescribed ISP (Internet Service Provider) so as to transmit and/or receive an electronic mail and receive the provision of various kinds of information (contents) such as a Web page provided on the internet.

In the television picture receiver of this embodiment, the telephone line is connected between the other party as a desired destination and the television picture a receiver through the telephone circuit 30 and the telephone line L so that a conversation can be made through the handset 31. As described above, the telephone circuit 30 has a function as, what is called, a modem and also serves to realize a telephone function.

Therefore, a control part 100 serves to control the telephone circuit 30 to be hooked on or off. When the control part controls the telephone circuit 30 to be hooked off, it is provided with a function as, what is called, a dialer for transmitting a prescribed dial signal.

To the control part 20, a hard disc drive 42 is connected through an interface (abbreviated it as an I/F part, hereinafter) 41. The hard disc drive 42 is loaded with a hard disc as a recording medium. The hard disc drive 42 can record data supplied from the control part 20 through the I/F part 41 on the hard disc, read the data recorded on the hard disc and supply the data to the control part 20 through the I/F part 41.

On the hard disc loaded in the hard disc drive 42, the contents of the so-called Web page got through the internet, the received electronic mail, or the electronic mail to be transmitted is stored and held, as mentioned above. The information recorded on the hard disc can be read out and employed as required.

To the control part 20, a remote command signal light receiving part 51 is connected through an I/F part 51. The remote command signal light receiving part 51 receives the infrared ray of a remote command signal from a remote commander 100, converts this signal to an electric signal and supplies the electric signal to the control part 20. Thus, the control part 20 controls the respective parts in accordance with the remote command signal from the remote commander 100 received by the remote command signal receiving part 52 to perform a process corresponding an instruction input operation from a user conducted to the remote commander 100.

The television picture receiver of this embodiment includes a television mode for receiving and selecting a television broadcasting signal, and demodulating and reproducing the selected television broadcasting signal, an internet mode for connecting the television picture receiver to the internet by providing the telephone circuit 30 as described above so as to access the contents of the Web page provided on the internet, an electronic mail (E-Mail) mode for writing an electronic mail, transmitting the written electronic mail or receiving an electronic mail to the address of a user by connecting the television picture receiver to the internet and a telephone mode for speaking to the other party as a desired mate by connecting a telephone line to the other party thorough a telephone network.

The television picture receiver of this embodiment includes a screen memo function for fetching an image displayed on the display 11 as a static image when the television picture receiver is under the state of a television mode. This screen memo function is a function that, when display information (character information) required for a user (viewer) who watches a television broadcast program is displayed on the display 11, a video signal for forming the image of one screen at that time is fetched to a capture memory part 5 described below and displayed on a child screen provided in a display area as a part of the display screen of the display 11.

In this case, the display information required by the user includes the telephone number of a destination to which a purchase application is made which is displayed when the user views the television broadcast program such as a television shopping, the electronic mail address of a destination for accepting opinions or impressions to the television broadcast program or a destination of the other party of a communication such as the URL of a Web page for providing the detailed information of information provided by the television broadcast program.

The television picture receiver of the present embodiment also includes a character recognizing function for detecting by recognition of the characters of information for specifying the other party of a communication such as a telephone number, an electronic mail address, an URL, etc. which are displayed as the display information (character information) in the image displayed by the video signal fetched by the screen memo function. The detected information can be secondarily used.

In the television picture receiver of this embodiment, when the user instructs the information for specifying the other party of the communication detected by the character recognizing function to be used, as described below in detail, the telephone circuit can be controlled to perform a communication between the other party of a desired destination and the television picture receiver in accordance with the detected information for specifying the other party of the communication.

Figure 2:
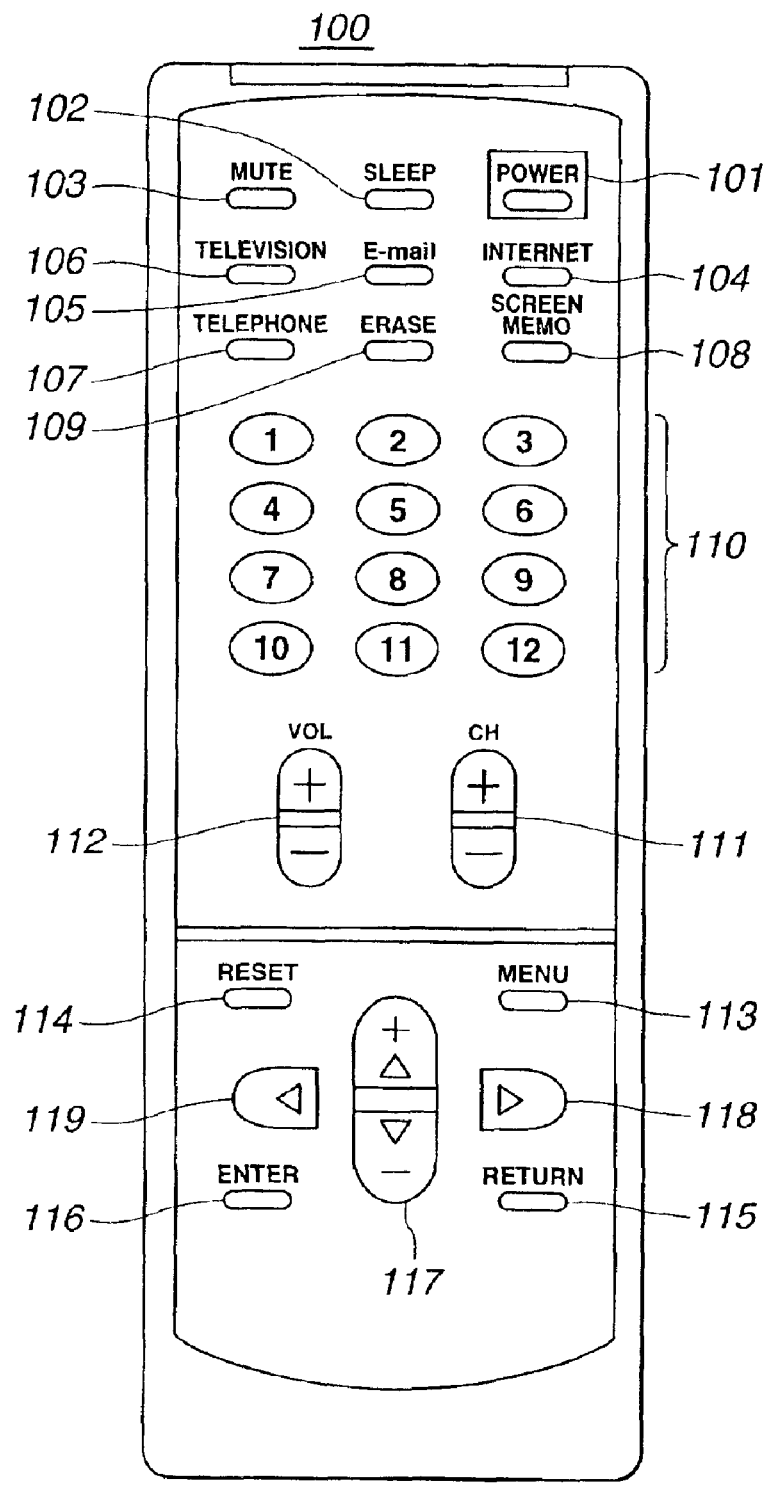
FIG. 2 is a plan view showing an appearance of a remote controller constituting the television picture receiver shown in FIG. 1.

In the television picture receiver of the present embodiment, the operating keys of the remote commander 100 are operated to manually switch respective modes. FIG. 2 is a diagram for explaining one example of the remote commander 100 of the television picture receiver of the present embodiment.

As shown in FIG. 2, the remote commander 100 for the television picture receiver of the present embodiment is provided with a power on and/or off key 101, and includes, as various kinds of function keys, an on and/or off key 102 of a sleep function, an on and/off key 103 of a mute function, a switching key 104 to an internet mode, a switching key 105 to an electronic mail mode, a switching key 106 to a television mode, a switching key 107 to a telephone mode, an execution key 108 of a screen memo function and an erase key 109 of a screen memo function.

The remote commander 100 includes, as shown in FIG. 2, a group of numeric character keys 110 for selecting channels, an up and/or down key 111 for selecting a channel of a television broadcasting signal, and an up and/or down key 112 of sound volume, and includes an on and/or off key 113 of a menu display, a reset key 114, a return key 115, an enter key 116 to execute processes from a prepared menu, and an up and/or down key 117, a right arrow key 118 and a left arrow key 119 used for moving a cursor.

The remote commander 100 generates a remote command signal corresponding to the operating key operated by the user and transmits it as an infrared ray signal. Thus, as described above, the user can not only turn on and/or off the power, but also turn on and/or off the mute function and the sleep function. Further, under the television mode, the user presses down the execution key 108 of the screen memo function, so that the user can execute the screen memo function.

The switching key 104 to the internet mode, the switching key 105 to the electronic mail mode, the switching key 106 to the television mode, and the switching key 107 to the telephone mode are pressed down, hence a mode can be switched to the mode corresponding to the depressed switching key.

As described above, immediately after the power is turned on, the television picture receiver of the present invention is brought to the television mode under the control of the control part 20. Then, during the television mode, a television broadcast signal received through the antenna 1 is supplied to the channel selecting part 2.

The channel selecting part 2 selects a television broadcast signal corresponding to a channel select instruction signal from the control part 20 from among the television broadcast signals from the antenna 1 and supplies the selected television broadcast signal to the demodulating part 3. The demodulating part 3 demodulates the supplied television broadcast signal, supplies the demodulated video signal and audio signal to the selector 4 and also supplies the video signal supplied to the selector 4 to the capture memory part 5.

The capture memory part 5 serves to realize the so-called screen memo function and is provided with a memory for storing the video signal for forming the image of one screen when the user presses down the execution key 108 of the screen memo function of the remote commander 100. The video signal fetched to the capture memory part 5 is D/A converted in the capture memory part 5 and the converted video signal is supplied to the input end b of the switch circuit 8 provided in the post-stage of the selector 4.

To the selector 4, the video signal and the audio signal supplied from the control part 20 are supplied through the D/A converting part 6 as well as the video signal and the audio signal from the demodulating part 3. The video signal and the audio signal supplied to the selector 4 through the D/A converting part 6 from the control part 20 are the information of the so-called Web page fetched through the telephone circuit, for instance, provided on the internet or the information of an electronic mail or the like.

The selector 4 switches whether either the video signal from the demodulating part 3 or the video signal from the control part 20 supplied through the D/A converting part 6 is supplied to the video signal processing part 7 or either of the video signal is supplied to the input end a of the switch circuit 8 in accordance with a switch control signal from the control part 20. The selector 4 switches whether either of the audio signal from the demodulating part 3 and the audio signal from the control part 20 supplied through the D/A converting part 6 is supplied to the audio signal amplifying part 12 in accordance with the switch control signal from the control part 20.

The video signal processing part 7 forms a displaying signal from the video signal from the selector 4 and supplies the displaying signal to the image synthesizing part 10. To the switch circuit 8 provided in the post-stage of the selector 4, are supplied the video signal from the selector 4 and the video signal for displaying the static image stored in the capture memory part 5 when the execution key 108 of the screen memo function is pressed down as described above, and switches whether either of them is outputted in accordance with the switch control signal from the control part 20.

The video signal outputted from the switch circuit 8 is supplied to the child screen processing part 9. The child screen processing part 9 serves to display images in a two-screen manner called a PinP (Picture in Picture). The PinP has a child screen in an area as a part of the display screen of the display and a parent screen in an area except the child screen so that images are independently displayed on the child screen and the parent screen.

The child screen processing part 9 applies a process for reducing the image by the video signal from the switch circuit 8 so as to correspond to the size of the display area as the child screen provided in the area as a part of the display screen of the display 11 and supplied the processed video signal to the image synthesizing part 10.

The image synthesizing part 10 combines the video signal (the video signal for the parent screen) from the video signal processing part 7 with the video signal (the video signal for the child screen) from the child screen processing part 9 to form a video signal for displaying the images of the two screens including the parent screen and the child screen on the display screen of the display 11 and supplies the formed video signal to the display 11.

Figure 3A:
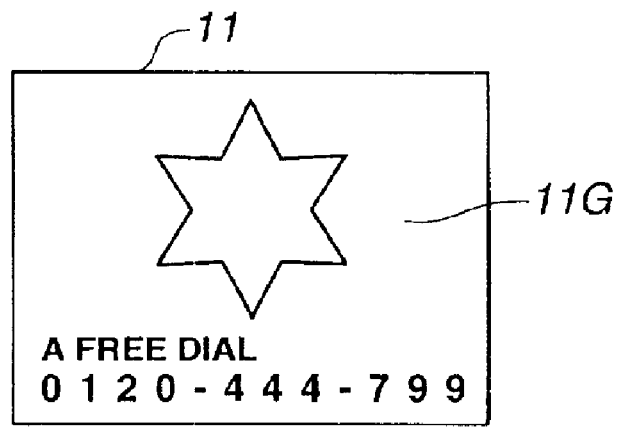
FIG. 3A to FIG. 3C show diagrams for explaining an example that a telephone number displayed as display information is secondarily used.

As described above, the television picture receiver of the present embodiment forms video signal processing means by the video signal processing part 7, the child screen processing part 9 and the image synthesizing part 10 so that the images can be displayed in such a manner that the images are independently displayed on the two screens of the parent screen 11M and the child screen 11S respectively as described below and shown in FIGS. 3B and 3C. In the television picture receiver of this embodiment, when the screen memo function is not performed, the combining process of images is not carried out in the image synthesizing part 10 and the image by the video signal from the video signal processing part 7 is displayed on the entire screen of the display screen of the display 11.

The audio signal amplifying part 12 amplifies an audio signal supplied thereto to a prescribed level and supplies the amplified audio signal to the speaker 13. Thus, a sound corresponding to the audio signal outputted from the selector 4 is emitted from the speaker 13.

[Use of Screen Memo Function]

As described above, in the television mode, when the information for specifying the other party of the communication such as a telephone number, an electronic mail address, a URL, etc. is included in the image fetched to the capture memory part 5 by using the screen memory function as the display information (character information), the display information is detected by recognizing the characters thereof to be secondarily used.

When the telephone number is displayed in the image of a television broadcast program which is fetched as a static image, when an electronic mail address is displayed in the image, and when an URL is displayed in the image, the operations of the television picture receiver when the television receiver secondarily uses these information will be described below.

[When the Telephone Number is Displayed]

FIG. 3 shows diagrams for explaining an example that, when the telephone number of a destination to which a purchase application is made is displayed as character information in a television broadcast program of a television shopping which a user views, the image thereof is fetched and secondarily used.

Under the television mode, a video signal from the demodulating part 3 is supplied to the display 11 through the selector 4, the video signal processing part 7 and the image synthesizing part 10. As shown in FIG. 3A, the image of the television broadcast program is displayed on the entire screen of the display screen 11G of the display 11. Further, in this case, an audio signal from the demodulating part 3 is supplied to the speaker 13 through the selector 4 and the audio amplifying part 12. Then, the sound of the television broadcast program is emitted from the speaker 13.

As shown in FIG. 3A, when the telephone number of the destination to which the purchase application is made is displayed, the user presses down the execution key 108 of the screen memo function of the remote commander 100 shown in FIG. 2. When the execution key 108 of the screen memo function is pressed down, an infrared ray remote command signal for instructing the execution of the screen memo function is transmitted from the remote commander 100. The remote command signal is received by the remote command signal light receiving part 52 of the television picture receiver and converted to an electric signal and the electric signal is supplied to the control part 20.

When the control part 20 receives the supply of the signal for instructing the execution of the screen memo function, the control part controls the capture memory part 5 to A/D convert the video signal from the demodulating part 3 and fetch the A/D converted video signal to the capture memory of the capture memory part.

The capture memory part 5 fetches the video signal of one screen (corresponding to one frame) from the demodulating part 3, D/A converts the fetched video signal and supplies the D/A converted video signal to the input end b of the switch circuit 8 as the video signal for displaying the image of one screen. At this time, the switch circuit 8 is switched to output the video signal supplied to the input end b in accordance with a control signal from the control part 20.

The control part 20 supplies the control signal to the synthesis processing part 10 to combine the video signal from the video signal processing part 7 with the video signal from the child screen processing part 9. Thus, as shown in FIG. 3B, the child screen 11S is provided on the display 11 and an area except the child screen serves as the parent screen 11M.

As mentioned above, to the child screen processing part 9, is supplied the video signal from the capture memory part 5 supplied to the input end b of the switch circuit 8. Therefore, as shown in FIG. 3B, the image (static image) including the telephone number fetched to the capture memory part 5 by the screen memo function as the display information is displayed on the child screen 11S and the image of the television broadcast program from the video signal processing part 7 is displayed on the parent screen 11M.

Figure 3B:
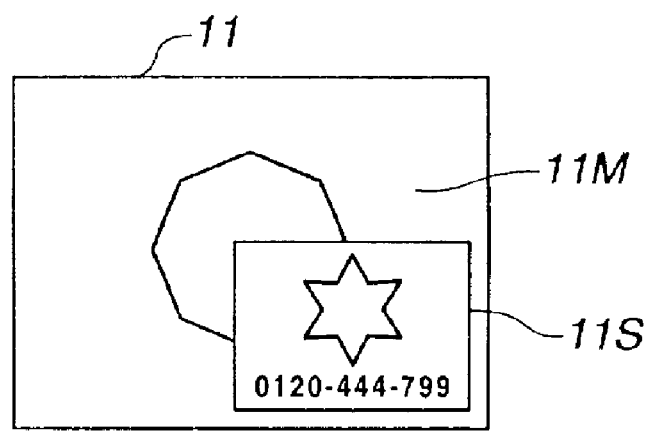
Figure 3C:
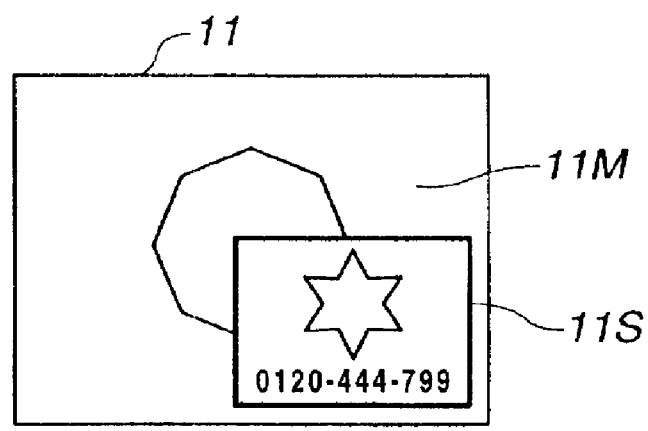

As shown in FIG. 3B, when the screen memo function is executed to display the image including the telephone number, and then, the other party is called on the telephone by using the telephone number displayed in the image, if the child screen is displayed on the display screen as shown in FIG. 3B, the execution key 108 of the screen memo function will be pressed down again. Then, the character recognizing process of the character information included in the image fetched to the capture memory part 5 is started by the control part 20.

The control part 20 reads and analyzes the video signal (vide data) fetched to the capture memory part 5 and defines an area in which the character information may be included. Then, the control part forms the matching data of a part which may have characters within the area and performs a pattern matching of the formed matching data with the matching data of characters previously prepared in the ROM 22 of the control part 20 to recognize the characters. Then, the recognized characters are encoded to character data and the character data is stored and held in the EEPROM 24.

In such a manner, the telephone number displayed in the image fetched to the capture memory part 5 as the static image is recognized as the character information by using the so-called pattern matching method and stored and held in the EEPROM 24 so that the character information can be secondarily employed.

The control part 20 hooks off the telephone circuit to read and decode the telephone number (character data) stored and held in the EEPROM 24 by recognizing the characters thereof, perform a dial operation using the decoded telephone number and connect the telephone line to the other party of the telephone number whose characters are recognized.

After that, when the telephone line is connected to the other party, a communication service can be done through the handset 31 connected to the telephone circuit 30 through the connecting terminal JK as shown in FIG. 1. In the case of this example, the telephone line is connected to a purchase application receiving center as a destination to which the purchase application of goods is made so that the purchase application of goods can be made. In this case, the user can automatically dial to telephone on the basis of the telephone number whose characters are recognized without performing the dial operation. Therefore, the user can rapidly telephone to the other party as a desired target without requiring a labor to separately take a note of the telephone number provided as the display information. Since the user can telephone on the basis of the telephone number whose characters are recognized, the user can rapidly and assuredly telephone to the other party as a desired target to speak thereto without dialing the wrong telephone number.

[When the Electronic Mail Address is Displayed]

FIG. 4 shows diagrams for explaining an example that, when a viewer views a television broadcast program in which an electronic mail address is displayed as character information as a destination to which an application for a present to viewers is made or a destination to which opinions or impressions are sent, the user fetches the image of the electronic mail address as a static image and secondarily uses it.

Figure 4A:
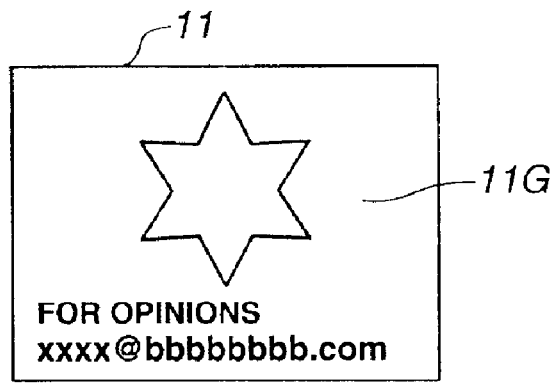
FIGS. 4A to 4D show diagrams for explaining an example that an electronic mail address displayed as display information is secondarily used.

As shown in FIG. 4A, when the image of the television broadcast program is displayed on the entire screen of the display screen of the display 11 and the electronic mail address is displayed as the destination to which the application for the present to viewers is made or the destination to receive the opinions or the impressions is displayed in the displayed image, the user presses down the execution key 108 of the screen memo function of the remote commander 100 shown in FIG. 2. Then, a video signal is fetched to the capture memory part 5 under the control of the control part 20 in the television picture receiver like the above described example that the telephone number is displayed as the character information by referring to FIG. 3. Then, as shown in FIG. 4B, an image including the electronic mail address fetched to the capture memory part 5 as a static image as character information is displayed on the child screen 11S and the image of the television broadcast program from the demodulating part 3 is continuously displayed on the parent screen 11M.

Figure 4B:
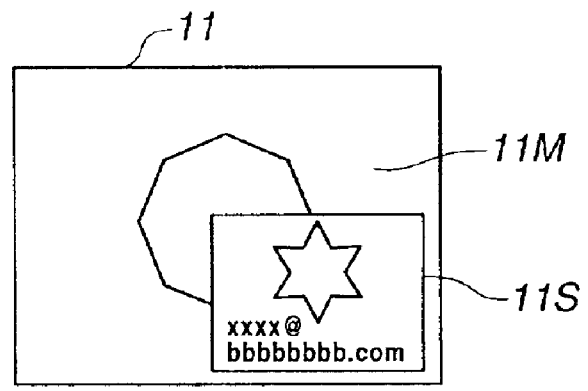

As shown in FIG. 4B, the screen memo function is executed to display the image including the electronic mail address on the child screen 11S as the static image, and then, an electronic mail is to be transmitted to the other party of the electronic mail address included in the static image, the execution key of the screen memo function is pressed down. Then, the control part 20 reads and analyzes the video data fetched to the capture memory part 5, defines an area which may possibly include character information and forms the matching data of a part which may have characters within this area. The control part performs a pattern matching of the formed matching data with the matching data of characters previously prepared in the ROM 22 of the control part 20 to store and hold the recognized characters in the EEPROM 24 as character data.

The electronic mail address displayed in the image displayed by the video signal fetched to the capture memory part 5 is recognized as the character information and it is stored and held in the EEPROM 24 so as to be secondarily used.

Figure 4C:
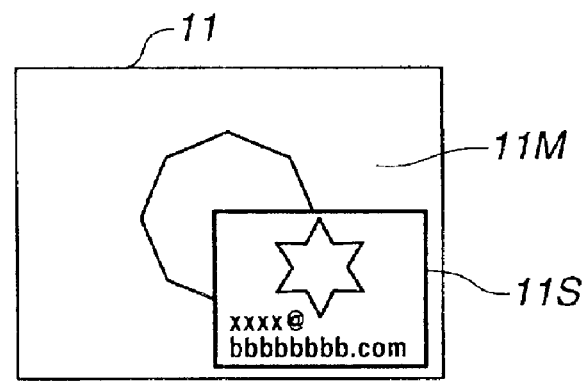

In the television picture receiver of the present embodiment, when the image including the electronic mail address is displayed on the child screen 11S as the static image, as shown in FIG. 4B, and then, the execution key of the screen memo function is pressed down again, for instance, the frame part of the child screen 11S is displayed in an inverted manner in order to show the user that an instruction for using the electronic mail address is received, as shown in FIG. 4C.

Then, the control part 20 reads and executes the writing program of an electronic mail stored in the ROM 22 or the hard disc of the hard disc drive 42 and supplies a video signal for displaying an electronic mail writing screen to the selector 4 through the D/A converting part 6.

The control part 20 controls the selector 4 to supply the video signal for displaying the electronic mail writing screen from the control part 20 to the video signal processing circuit 7, supply the video signal from the demodulating part 3 to the input end a of the switch circuit 8 and supply the audio signal from the demodulating part 3 to the audio signal amplifying part 12.

Further, the control part 20 controls the switch circuit 8 to output the video signal supplied to the input end a of the switch circuit 8 from the switch circuit 8, supplies the outputted video signal to the child screen processing part 9 and controls the image synthesizing part 10 to display the image in the manner of PinP.

Figure 4D:
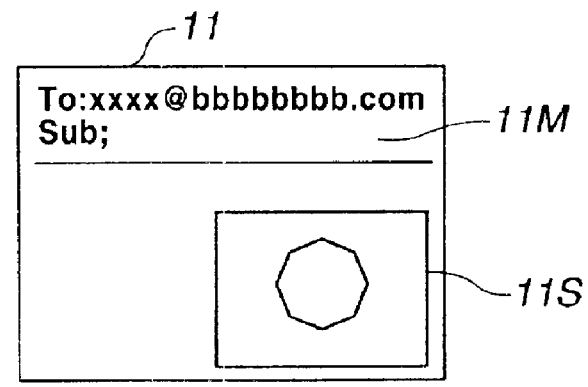

Thus, as shown in FIG. 4D, on the parent screen 11M is displayed the electronic mail writing screen on which the electronic mail address detected by recognizing the characters is inputted as the electronic mail address of the other party as a target. An electronic mail can be prepared by employing this electronic mail writing screen.

Then, the up and/or down key 117 of the remote commander 100 is operated to select a transmit button icon (not shown) provided in the electronic mail writing screen and the enter key 116 of the remote commander 100 is pressed down to instruct the television picture receiver to transmit the prepared electronic mail.

When the control part 20 receives this transmit instruction, the control part 20 controls the telephone circuit 30 to be hooked off, reads the telephone number of a prescribed ISP previously stored in the EEPROM 24 and telephones, so that the telephone line is connected to the desired ISP. Then, the prepared electronic mail is transmitted to the mail box of the other party specified by the electronic mail address whose characters are recognized through the ISP.

On the other hand, as shown in FIG. 4D, on the child screen is displayed the image of the television broadcast program from the demodulating part 3 and the sound of the television broadcast program is emitted from the speaker. Thus, even when the electronic mail is written, or the electronic mail is transmitted, the attention to the television broadcast program which the viewer is watching is not interrupted, information provided by the television broadcast program can be prevented from being overlooked or being failed to hear.

Since, as an electronic mail address, the electronic mail address whose characters are recognized in the control part 20 of the television picture receiver is directly used, the user does not need to manually input the electronic mail address having relatively many characters, and accordingly, the user can rapidly and precisely write and transmit an electronic mail to the other party as a desired target.

[When the URL is Displayed]

FIG. 5 shows diagrams for explaining an example that, when the URL of a Web page for providing information associated with a television broadcast program which a viewer views or the URL of a Web page for providing the detailed information of the information provided by the broadcast program is displayed as character information, the image thereof is fetched as a static image and secondarily employed.

Figure 5A:
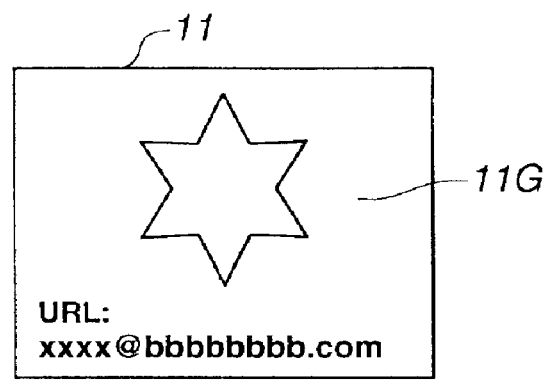
FIGS. 5A to 5D show diagrams for explaining an example that a URL displayed as display information is secondarily used.
Figure 5B:
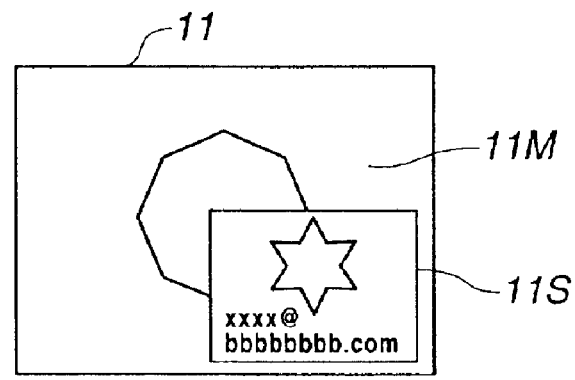

As shown in FIG. 5A, the image of the television broadcast program is displayed on the entire screen of the display screen 11G of the display 11. When the URL of the Web page provided in the internet is displayed in the displayed image, a user presses down the execution key 108 of the screen memo function of the remote commander 100 shown in FIG. 2. In this case, a video signal is also fetched to the capture memory 5 under the control of the control part 20 in the television picture receiver like the example that the telephone number is displayed as the character information as described by using FIG. 3. As shown in FIG. 5B, the image including the URL fetched to the capture memory part 5 as the character information is displayed on the child screen 11S and the image of the television broadcast program from the demodulating part 3 is continuously displayed on the parent screen 11M.

As shown in FIG. 5B, when the screen memo function is executed to display the image including the URL as the static image, and then, the Web page specified by the URL included in the static image is to be accessed, the execution key of the screen memo function is pressed down again. Then, the control part 20 reads and analyzes the video data fetched to the capture memory part 5 to define an area which may possibly include the character information and forms the matching data of a part which may have characters within this area. Then, the control part performs a pattern matching of the formed matching data with the matching data of characters previously prepared in the ROM 22 of the control part 20 to recognize the characters and store and hold the recognized characters in the EEPROM 24 as character data.

The URL displayed in the static image fetched to the capture memory part 5 as the static image is recognized as the character information and stored and held in the EEPROM 24 in such a manner, so that the URL can be secondarily used.

Figure 5C:
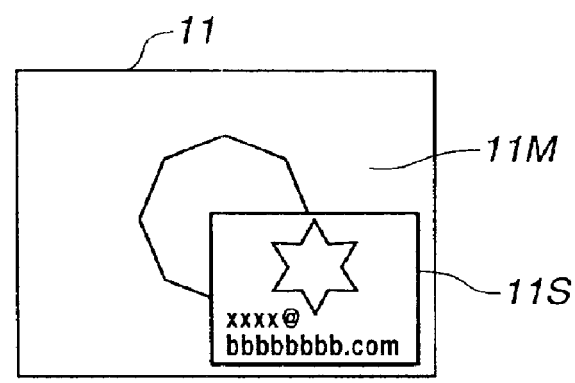

In the television picture receiver of the present embodiment, in order to show the user that an instruction for using the URL is received, for instance, the frame part of the child screen 11S is displayed in an inverted manner as shown in FIG. 5C. After that, the control part 20 reads and executes the access program (what is called a browser) of the Web page stored in the ROM 22 or the hard disc of the hard disc drive 42. Then, the control part supplies a video signal for displaying the access screen of the Web page to the selector 4 through the D/A converting part 6.

The control part 20 controls the selector 4 to supply the video signal for displaying the access screen of the Web page from the control part 20 to the video signal processing circuit 7, supply the video signal from the demodulating part 3 to the input end a of the switch circuit 8 and supply the audio signal from the demodulating part 3 to the audio signal amplifying part 12.

Further, the control part 20 supplies a switch control signal to the switch circuit 8 to switch the switch circuit so that the video signal supplied to the input end a of the switch circuit 8 is outputted and supplied to the child screen processing part 9, and controls the image synthesizing part 10 to continuously display the image in a manner of PinP.

At the same time, the control part 20 controls the telephone circuit 30 to be hooked off, reads the telephone number of a prescribed ISP previously stored in the EEPROM 24 and telephones the ISP to connect a telephone line. Then, the control part accesses the Web page specified by the URL whose characters are recognized through the ISP to download the Web page.

The downloaded Web page is supplied to the image synthesizing part 10 through the D/A converting part 6, the selector 4 and the video signal processing circuit 7 from the control part 20. Thus, as shown in FIG. 5D, the Web page specified by the URL detected by recognizing the characters is displayed on the parent screen 11M.

Figure 5D:
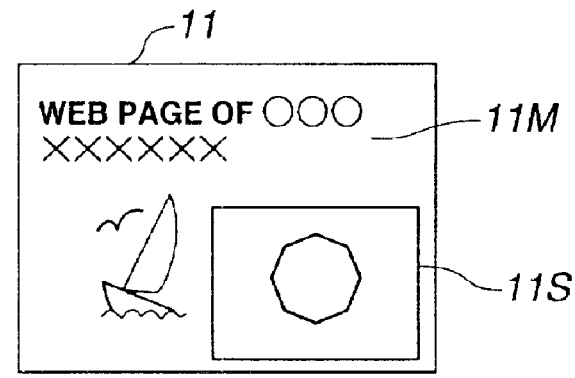

On the other hand, as shown in FIG. 5D, the image of the television broadcast program from the demodulating part 3 is displayed on the child screen and the sound of the television broadcast program is emitted from the speaker, so that, even when the Web page is displayed, the attention of a viewer to the television broadcast program which the viewer is watching is not interrupted, and the information provided by the television broadcast program can be prevented from being overlooked or from being failed to hear.

As the URL, since the URL whose characters are recognized is directly used in the control part 20 of the television picture receiver, the user does not need to manually input the URL having relatively many characters, and can rapidly and precisely download and display a desired Web page.

Since the telephone number, the electronic mail address and the URL displayed in the image of the television broadcast program whose characters are recognized are stored and held in the EEPROM 24, they can be repeatedly employed. Accordingly, when the connection of a telephone line cannot be made even by calling the other party of a desired target or a desired ISP on the telephone, a redialing operation can be automatically performed at prescribed intervals or the telephone number can be inputted again to connect the telephone line at a timing instructed by the user.

[Processes of Television Picture Receiver Upon Execution of Screen Memo Function]

Now, processes upon execution of the screen memo function under the television mode will be described below by referring to flowcharts shown in FIGS. 6 to 8. When the power of the television picture receiver of the present embodiment is turned on to operate under the television mode, the control part 20 of the television picture receiver of the present embodiment performs the processes shown in FIGS. 6 to 8.

Firstly, the control part 20 waits for the input of an operation from a user through the remote commander 100 (step S101). In the deciding process of the step S101, when the control part decides that the input of the operation is done, the control part decides whether or not the input of the operation instructs the execution of the screen memo function (step S102).

In the deciding process of the step S102, when the control part 20 decides that the input of the operation is not an instruction for executing the screen memo function, the control part 20 carries out other processes corresponding to the input of the operation, for instance, a process such as the selection of a channel or the adjustment of sound volume, etc. (step S103) and repeats the processes from the step 101. In the television picture receiver of the present embodiment, when the television mode is switched to other mode, the processing routine (processing program) of the switched mode is executed. Then, when the mode is switched to the television mode, the processes from the step S101 are repeated.

In the deciding process of the step S102, when the control part 20 decides the input of the operation is an instruction for executing the screen memo function, the control part 20 controls the capture memory part 5 as described above to fetch a video signal for forming an image of one screen to be displayed (step S104), and controls the switch circuit 8 and the image synthesizing part 10 to display the image by the fetched video signal on the child screen 11S and the image of the television broadcast program on the parent screen 11M (step 105).

The control part 20 decides whether or not the use of character information in the image displayed on the small screen 11S as a static image is instructed, that is, whether or not the execution key 108 of the screen memo function is pressed down (step S106). In the deciding process of the step S106, when the control part decides that the execution key 108 of the screen memo function is not pressed down, the control part decides whether or not the erase key 109 for instructing the screen memo function to be canceled and the child screen to be erased is pressed down (step S107).

In the deciding process of the step S107, when the control part 20 decides that the erase key 109 is not pressed down, the control part 20 repeats the processes from the step S106. When the control part 20 decides that the erase key 109 is pressed down, the control part 20 controls the image synthesizing part 10 to stop the synthesizing process of the video signal and thus erase the child screen (step S108), and repeats the processes from the step S101.

In the deciding process of the step S106, when the control part decides that the execution key 108 of the screen memo function is pressed down again, the control part 20 reads the video signal fetched to the capture memory part 5 and carries out a character recognizing process by using the pattern matching method as described above (step S109).

The control part 20 decides, as a result of the character recognizing process, whether or not the character information can be recognized (step S110). When the control part decides that the character information cannot be recognized, that is, the character information does not exist, the control part decides whether or not the erase key 109 for instructing the screen memo function to be canceled and the child screen to be erased is pressed down (step S111).

In the deciding process of the step S111, when the control part decides that the erase key 109 is not pressed down, the control part repeats the processes from the step S111 in the television picture receiver of the present embodiment to wait for the depression of the erase key 109, since the character information does not exist or the characters cannot be recognized.

In the deciding process of the step S111, when the control part decides that the erase key 109 is pressed down, the control part 20 controls the image synthesizing part 10 to stop the synthesizing process of the video signal and thus erase the child screen (step S112), and repeats the processes from the step S101.

Figure 7:
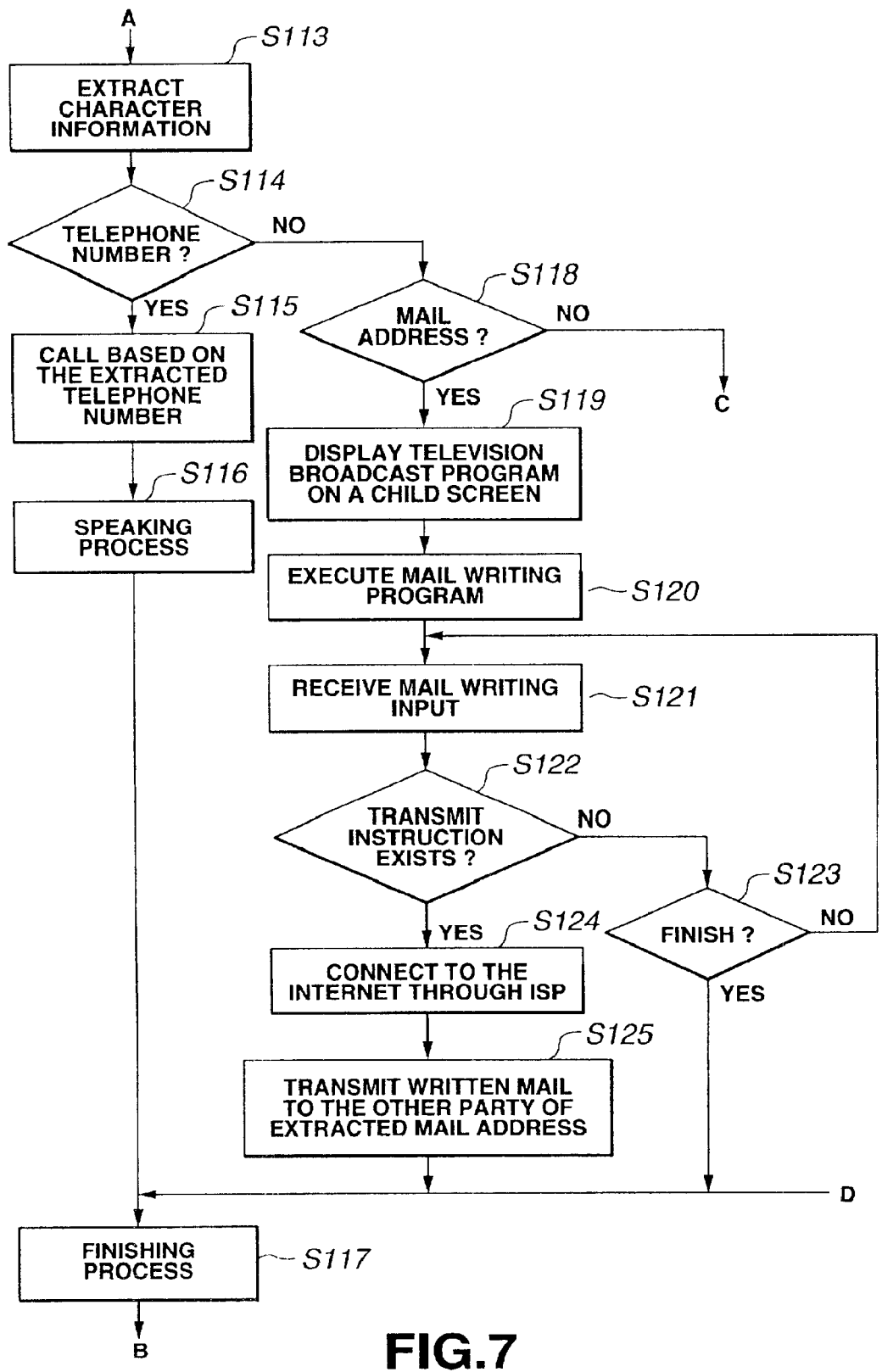
FIG. 7 is a flowchart subsequent to FIG. 6.

Further, in the deciding process of the step S110, when the control part decides that the character recognition can be successfully carried out and the character information exists, the control part moves to processes shown in FIG. 7, extracts information for specifying the other party of a communication from the recognized character information and stores and holds it in the EEPROM 24 of the present embodiment (step S113).

The control part 20 decides whether or not the character information extracted in the step S113 is a telephone number (step S114). In this decision, when the extracted character information is composed of numeric characters having the prescribed number of digits, or only of the numeric characters having the prescribed number of digits and prescribed symbols such as a left parenthesis "(", a right parenthesis")", a hyphen "-", etc., the control part decides that the extracted character information is a telephone.

In the deciding process of the step S114, when the control part decides that the extracted character information is a telephone number, the control part controls the telephone circuit 30 to perform a calling process in accordance with the telephone number extracted with the characters recognized and connect the telephone line to the other party as a target (step S115) and speak to the other party as the target (step S116).

Figure 6:
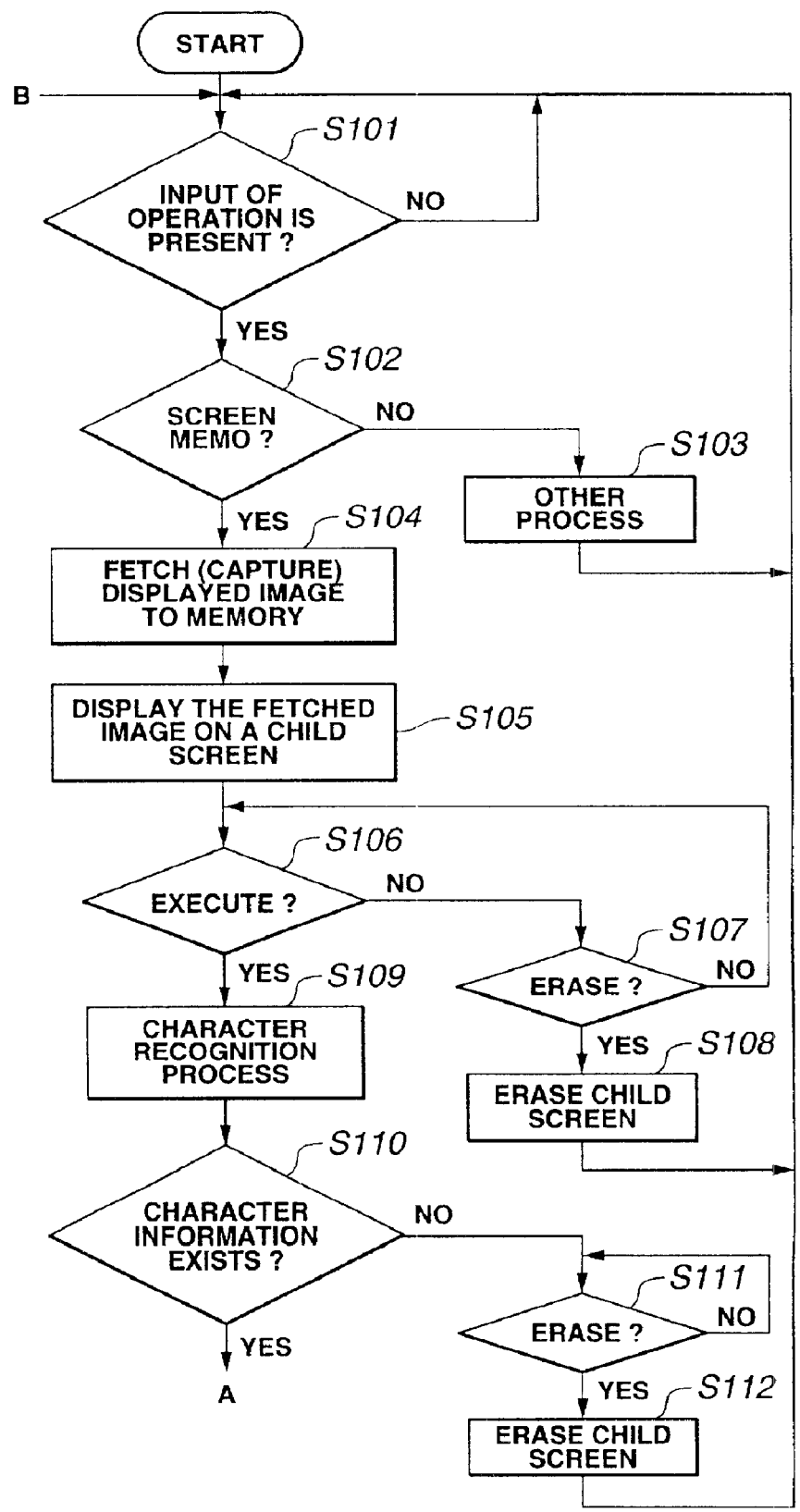
FIG. 6 is a flowchart for explaining processes upon execution of a screen memo function in a television mode.

After the completion of speaking, when an on-hook operation is carried out, the control part 20 controls the image synthesizing part 10 in this case to erase the display of the child screen and perform a finishing process for displaying the image of the television broadcast program on the entire screen of the display screen of the display 11 (step S117) and repeats the processes from the step S101 shown in FIG. 6.

In the deciding process of the step S114, when the control part decides that the extracted character information whose characters are recognized is not the telephone number, the control part decides whether or not the extracted character information whose characters are recognized is an electronic mail address (step S118). In this decision, the control part decides that the extracted character information is the electronic mail address by recognizing a fact that the extracted character information is composed of the numeric characters having the prescribed number of digits or alphabetical characters and a mark "@" exists at a prescribed position.

In the deciding process of the step S118, when the control part decides that the extracted character information whose characters are recognized is the electronic mail address, the control part 20 controls the selector 4 and the switch circuit 8 to display the television broadcast program on the child screen 11S (step S119), and executes a writing program of an electronic mail to display the writing screen of the electronic mail on the parent screen 11M (step S120).

The control part receives an input for writing an electronic mail (step S121), and decides whether or not an input of a transmit instruction from a user is received (step S122). In the deciding process of the step S122, when the control part decides that the input of the transmit instruction is not received, the control part decides whether or not an input of a finish instruction is received (step S123). The deciding process of the step S123 is a process for deciding whether or not the writing program of the electronic mail is quitted without transmitting the written electronic mail irrespectively of writing the electronic mail.

In the deciding process of the step S123, when the control part decides that the input of the finish instruction is not received, the control part repeats the processes from the step S121. In the deciding process of the step S123, when the control part decides that the finish instruction is received, the control part performs finishing process of the step S117. In this case, the control part performs a storage process of the written electronic mail to finish the writing program of the electronic mail, erases the child screen to display the image of the television broadcast program on the entire screen of the display screen of the display 11 and repeats the processes from the step S101.

In the deciding process of the step S122, when the control part decides that the input of the transmit instruction is received, the control part controls the telephone circuit 30 to use the telephone number of a prescribed ISP previously stored in the EEPROM 24, connect the telephone line to the ISP and connect it to the internet through the ISP (step S124).

Then, the written electronic mail is transmitted to the mail box of the other party as a target through the ISP and the internet by using the extracted electronic mail address whose characters are recognized (step S125). Then, in the step S117, the finishing process is performed. In this case, the writing program of the electronic mail is finished to erase the child screen and display the image of the television broadcast program on the entire screen of the display screen of the display 11, and repeats the processes from the step S101.

Figure 8:
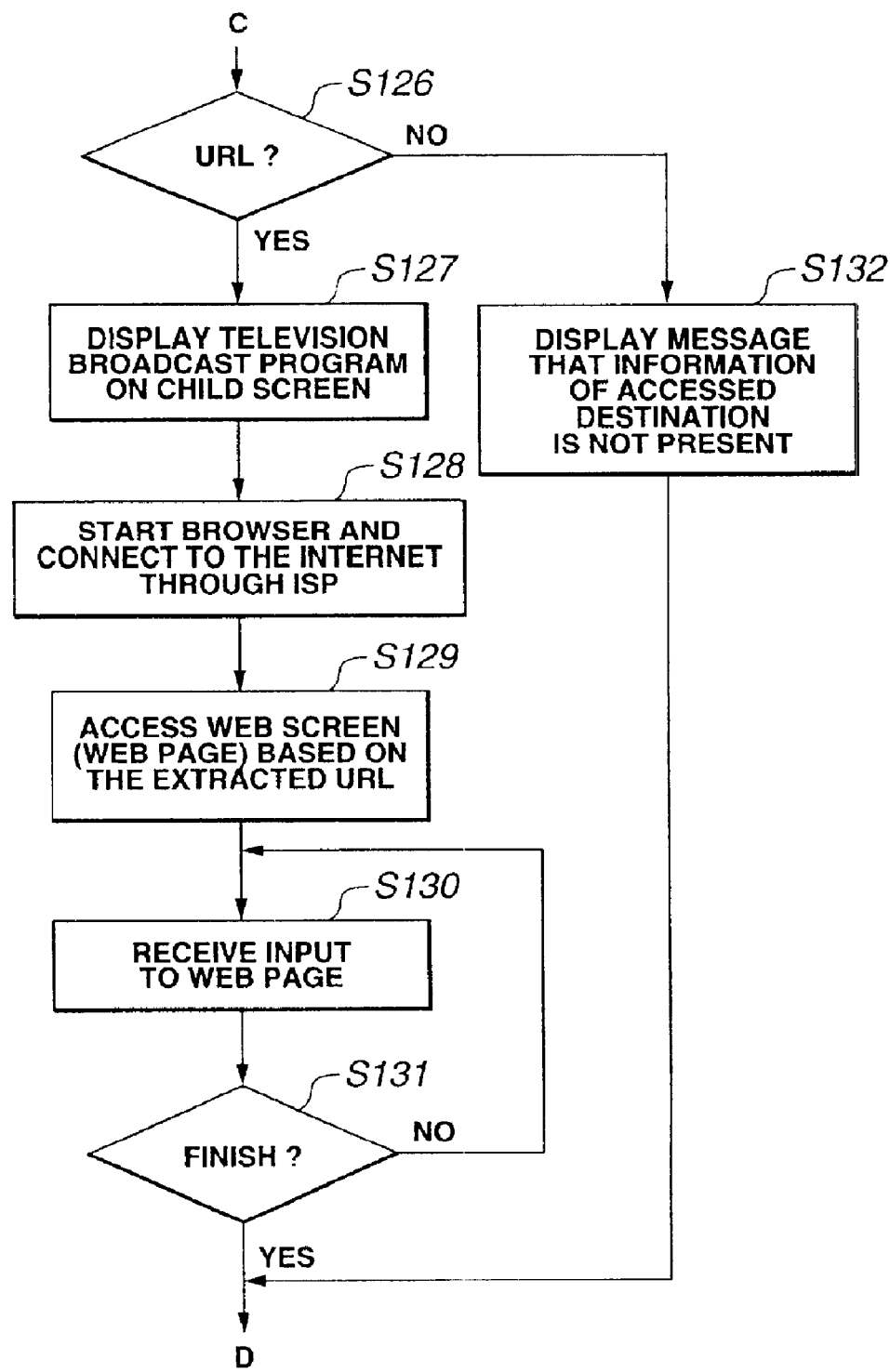
FIG. 8 is a flowchart subsequent to FIG. 7.

In the deciding process of the step S118, when the control part decides that the extracted character information whose characters are recognized is not the electronic mail address, the control part 20 shifts to processes shown in FIG. 8 to decide whether or not the extracted character information whose characters are recognized is the URL (step S126). In this decision, when the extracted character information includes a character string used in the URL such as "http://", etc. the extracted character string can be determined to be the URL.

In the deciding process of the step S126, when the control part decides that the extracted character string whose characters are recognized is the URL, the control part 20 controls the selector 4 and the switch circuit 8 as shown in FIG. 8 to display the television broadcast program on the child screen 11S (step S127).

The control part 20 starts a browser, connects the telephone line to the ISP using the telephone number of a prescribed ISP previously stored in the EEPROM 24 and connects the telephone line to the internet through the ISP (step S128). Then, the control part accesses the Web page specified on the basis of the URL extracted by recognizing the characters, supplies the Web page to the video signal processing part 7 through the D/A converting part 6 and the selector 4 and displays the Web page on the parent screen 11M of the display 11 (step S129).

Then, the control part receives an input to the Web page (step S130) and decides whether or not a finish instruction is inputted (step S131). In the deciding process of the step S131, when the control part decides that the finish instruction is not inputted, the control part 20 repeats the processed from the step S130.

In the deciding process of the step S131, when the control part decides that the finish instruction is inputted, the control part returns to the process of the step S117 shown in FIG. 7 to perform the finishing process. In this case, the control part quits the browser to erase the child screen and display the image of the television broadcast program on the entire screen of the display screen of the display 11 and repeats the processes from the step S101.

In the deciding process of the step S126, when the control part decides that the extracted character information whose characters are recognized is not the URL, the control part performs a process for displaying a message that information of accessed destination is not present on the display screen of the display 11 (step S132) and returns to the process of the step S117 shown in FIG. 7. In this case, the control part erases the child screen and display the image of the television broadcast program on the entire screen of the display screen of the display 11 and repeats the processes from the step S101.

As described above, the television picture receiver of the present embodiment performs the screen memo function, under the television mode, so that the image including necessary information such as a telephone number, an electronic mail address, a URL, etc. as the display information can be fetched as a static image and displayed on the child screen.

Then, the character information as the display information included in the fetched image is detected by recognizing the characters, so that a user can telephone, transmit an electronic mail, or access a Web page by using the detected character information. Therefore, the user can rapidly and accurately perform a communication with the other party as a desired target without separately inputting the information for specifying the other party of a communication such as the telephone number, the electronic mail address, the URL, etc.

In the above-described embodiment, when the screen memo function is performed, the image is displayed in the display manner called a PinP and the image including the necessary information fetched as the static image as the display information is displayed on the child screen.

However, the displaying manner of the image is not limited to the PinP. For instance, the image may be displayed in a displaying manner called a PoutP (Picture out Picture) that the child screen is provided outside the display area of the parent screen so that child screen does not hide the image displayed on the parent screen in the display screen of the display including the two screens of the parent screen and the child screen.

Further, the image may be displayed in a displaying manner for performing a two-screen display of a left screen and a right screen formed by longitudinally dividing the display screen of the display into two parts in the center of a transverse direction. Briefly, the present invention may be applied to any displaying manner by which the image can be displayed by a displaying function having two or more screens.

Still further, in the above-described embodiment, although a CRT display is employed as the display 11, it is to be understood that the present invention is not limited thereto and a display such as an LCD (Liquid Crystal Display) may be employed.

Further, a coordinate position detecting means provided on a display screen such as a so-called touch panel (touch screen) may be attached to the display screen of the display, and may be used as an input of a using instruction of information for specifying the other party of a communication displayed on the child screen 11S when the fingers of a user come into contact with the display area of the child screen 11S on which the information for specifying the other party of the communication is displayed.

It is to be recognized that the fetch instruction input accepting means or the using instruction input accepting means may be composed not only of button switches provided in the remote commander or the television picture receiver, but also of a touch panel attached to the display screen of the display and the display information displayed on the display.

Further, in the above-described embodiment, the screen memo key 108 of the remote commander 100 is pressed down to capture the displayed image, and the screen memo key 108 is pressed down again to transmit a telephone call when a telephone number exists in the image captured and displayed on the child screen, write a mail when a mail address exists therein, jump on a Web page when a URL exists therein and erase the child screen in a case except them. However, the present invention is not limited thereto.

In any of the cases that the telephone call is transmitted, if the above-described telephone number exists, the mail is written, if the mail address exists, and the Web page is jumped on, if the URL exists, when the screen memo key 108 is pressed down again, the display of the child screen is erased. Further, in these cases, when it is desired to perform a communication process in accordance with the displayed and character-recognized information, the process is shifted to a process to be executed next by a different operation.

For example, in the cases that the telephone call is transmitted, if the telephone number exists, the mail is written, if the mail address exists, and the Web page is jumped on, if the URL exists, when any of the four-way key of the up and/or down key 117, the right arrow key 118 and the left arrow key 119 of the remote commander 100 is operated, the information such as the telephone number, the electronic mail address or the URL is displayed in an inverted or highlighted manner.

The enter key 116 is pressed down to telephone, write and transmit the electronic mail or connect the telephone line to the internet so as to jump on the Web page on the basis of the information included in the captured image and displayed in an inverted or highlighted manner.

In such a manner, the image on which necessary information is displayed can be captured and displayed on the child screen and the child screen can be erased by a simple operation such as the depression of the same screen memo key. When the communication process is carried out based on the character-recognized information displayed on the child screen, a user can be ascertained whether or not the communication is carried out. Therefore, the communication can be prevented from being readily carried out and a wasteful communication cost can be avoided.

In the above-described embodiment, although the communication with the other party is performed by using the screen memo function, it is to be noted that the switch key to the internet mode, the switch key to the electronic mail mode and the switch key to the telephone mode of the remote commander 100 may be operated in the television picture receiver of the present embodiment to switch a mode to the respective modes and input the URL, the electronic mail address or the telephone number so that the Web page can be accessed, the electronic mail can be transmitted or the telephone call can be transmitted.

In the above-described embodiment, although the present invention is applied as an example to the television picture receiver for receiving and selecting the analog television broadcasting signal of ground wave, the present invention is not limited thereto. The present invention can be also applied to a television picture receiver having a satellite broadcast receiving function, a television picture receiver having a data broadcast receiving function, and a television picture receiver having a cable television broadcast receiving function. Further, the present invention can be applied to a television picture receiver having a plurality of receiving functions of these receiving functions.

In the above-described embodiment, although the present invention is applied, as an example, to the television picture receiver, the present invention is not limited thereto. The present invention can be applied to, for example, a receiver called an STB (Set-Top Box) as a cable television broadcast receiver or a receiver called an IRD (Integrated Receiver/Decoder).

In this case, the receiver may be loaded with a telephone circuit for realizing a communicating function, a child screen processing part or an image synthesizing part for realizing a two screen function, and further a capture memory part and various kinds of programs such as a program required for performing a character recognizing process. Thus, in the receiver, an image may be captured, a two-screen process may be carried out and a processed video signal may be supplied to a monitor picture receiver.

While viewing the image displayed on the display screen of the monitor picture receiver, the receiver is controlled so that an image including character information for specifying the other party of a communication as display information can be fetched as a static image, the character information included in the fetched image can be detected by recognizing characters and a communication can be performed by employing the detected information like the television picture receiver of the above-described embodiment.

The present invention can be also applied to a video signal reproducing device for reproducing a video signal stored in a recording medium such as a VTR or a DVD device. In this case, a video signal for forming an image of one screen on which information indicating the other party of a communication is displayed among images displayed by a reproduced video signal can be fetched and the information indicating the other party of the communication displayed by the fetched video signal can be extracted by recognizing characters and employed for a communication process.

For instance, the present invention may be similarly applied to a video signal processor and an image display device serving as the monitor picture receiver of the television picture receiver and having an external input terminal. In this case, the video signal for forming the image of one screen on which the information indicating the other party of a communication is displayed among the images displayed by a video signal supplied through the external input terminal can be fetched and the information indicating the other party of the communication displayed by the fetched video signal can be extracted by recognizing the characters and employed for the communication process.

Specifically, the video signal for forming the image of one screen to be fetched may be a video signal of a television broadcast signal received and selected in the channel selecting part loaded on its own machine or a video signal supplied through the external input terminal from an external receiver or the video signal reproducing device.

Accordingly, when the external input terminal is provided in the television picture receiver shown in FIG. 1, the video signal from the demodulating part 3 may be outputted and supplied to the selector 4 in the pre-stage of the selector 4 or a selector for switching whether or not a video signal from the external input terminal is outputted and supplied to the selector 4 may be provided. The selector may be switched by an external input switch key provided on the remote commander.

Further, the information for specifying the other party of the communication detected by recognizing the characters is stored in, for instance, the EEPROM or the like, so that the stored information can be used as a so-called address book. Further, the URL detected by recognizing the characters can be registered and used as a URL employed for a bookmark or a favorite function as the function of a browser. Still further, the information indicating the other party of the communication is not limited to the telephone number, the electronic mail address and the URL and may include information for specifying the other party of a communication by a mail such as zip codes, addresses and destinations, etc.

INDUSTRIAL APPLICABILITY

In the present invention, character information provided as display information can be extracted and secondarily employed. Further, when the character information provided as the display information is information for specifying the other party of a communication such as telephone number, an electronic mail address, a URL or the like, the information can be detected without annoying the hand of a user and a communication with the other party as a desired mate can be rapidly and precisely performed and the internet can be more simply used.

What is claimed is:

1. A video signal processor, comprising:

fetch instruction input accepting means for accepting an image fetch instruction input in accordance with one of a received video signal and a read video signal;

image storing means for fetching the video signal of a screen and for storing the video signal when the image fetch instruction input is accepted by the fetch instruction input accepting means;

video signal processing means for providing a subscreen in a display area as apart of a display screen when the fetch instruction input is accepted by the fetch instruction input accepting means so that a fetched image of the video signal of the screen stored in the image storing means is displayed on the subscreen and a main image in accordance with one of the received video signal and the read video signal is displayed on the main screen of the display area except the subscreen;

character information recognizing means for recognizing characters in character information displayed in the fetched image of the video signal of the screen stored in the image storing means;

character information extracting means for extracting necessary information from the character information containing the characters recognized by the character recognizing means; and character information storing means for storing the character information extracted by the character information extracting means.

2. The video signal processor according to claim 1, wherein the information extracted by the character information extracting means is information indicating an other party of a communication.

3. The video signal processor according to claim 2, wherein the information indicating the other party of the communication is a telephone number.

4. The video signal processor according to claim 2, wherein the information indicating the other party of the communication is an electronic mail address of a destination to which an electronic mail is transmitted.

5. The video signal processor according to claim 2, wherein the information indicating the other party of the communication is specific information for specifying provided information provided on a communication network.

6. The video signal processor according to claim 1, further comprising a display element having the display screen provided with the main screen and the subscreen.

7. A video signal processor, comprising:

communicating means connected to a communication network so that a communication process is performed;

fetch instruction input accepting means for accepting an image fetch instruction input in accordance with one of a received video signal and a read video signal;

image storing means for fetching the video signal of a screen and for storing the video signal when the fetch instruction input is accepted by the fetch instruction input accepting means;

video signal processing means for providing a subscreen in a display area as a part of a display screen when the fetch instruction input is accepted by the fetch instruction input accepting means so that a fetched image of the video signal of the screen stored in the image storing means is displayed on the subscreen and a main image in accordance with one of the received video signal and the read video signal is displayed on a main screen of the display area except the subscreen;

using instruction input accepting means for accepting a using instruction input of character information included in the fetched image displayed on the subscreen;

character information recognizing means for recognizing characters in the character information displayed in the image of the video signal of the screen stored in the image storing means when the using instruction input is accepted through the using instruction input accepting means;

character information extracting means which extract character information indicating an other party of a communication from the character information, the characters of the character information being recognized by the character recognizing means; and control means for performing control to perform a communication process through the communicating means based on the character information extracted by the character extracting means.

8. The video signal processor according to claim 7, further comprising speaking means connected to the communicating means for speaking to the other party, wherein when the character information indicating the other party of the communication is a telephone number the control means controls the communicating means to connect a communication line to the telephone number of the other party so as to speak through the speaking means.

9. The video signal processor according to claim 7, wherein when the character information indicating the other party of the communication is electronic mail address information showing a destination to which an electronic mail is transmitted the communication control means displays a creating screen for the electronic mail such, that the electronic mail address information is inputted and the electronic mail is created and transmitted.

10. The video signal processor according to claim 9, wherein when the using instruction input is accepted by the using instruction input accepting means the video signal processing means displays the image in accordance with one of the received video signal and the read video signal on the subscreen and the creating screen for the electronic mail is displayed on the main screen.

11. The video signal processor according to claim 7, wherein when the information indicating the other party of the communication is specific information for specifying information provided on the communication network the communication control means controls the communicating means to connect a communication line to the communication network such that the provided information is used by using the specific information.

12. The video signal processor according to claim 11, wherein when the using instruction input is accepted by the using instruction input accepting means the video signal processing means displays the fetched image in accordance with the supplied video signal on the subscreen and the provided information is displayed on the main screen.

13. The video signal processor according to claim 7, further comprising a display element having a display screen provided with the main screen and the subscreen.

* * * * *